United States Patent [19]

Cobb, Jr.

[11] Patent Number: 4,896,953

[45] Date of Patent: Jan. 30, 1990

[54] ANAMORPHIC WIDE ANGLE SAFETY LENS

[75] Inventor: Sanford Cobb, Jr., Saint Mary's Point, Minn.

[73] Assignee: Minnesota Mining and Manufacturing Company, Saint Paul, Minn.

[21] Appl. No.: 229,653

[22] Filed: Aug. 8, 1988

[51] Int. Cl.⁴ .............................................. G02B 3/08
[52] U.S. Cl. ..................................... 350/452; 350/433
[58] Field of Search ........................ 350/452, 433, 434

[56] References Cited

U.S. PATENT DOCUMENTS 2,303,113 11/1942 Eckel .................................... 350/433
4,385,808 5/1983 Vanderwerf ......................... 350/452

OTHER PUBLICATIONS

3M Visual Products Quotation No. JA-400-L, dated Jan. 27, 1977, pp. 1-3.
Brochure on Blind Area Viewer published by M. B. Associates, pp. 1-4.
Copy of engineering drawing of M. B. Associates lens.

Primary Examiner—Bruce Y. Arnold
Assistant Examiner—Rebecca D. Gass
Attorney, Agent, or Firm—Donald M. Sell; Walter N. Kirn; Stephen W. Buckingham

[57] ABSTRACT

In the present invention a wide angle safety lens has two major surfaces, each of which is a structured surface. The first major surface has a plurality of parallel linear prisms forming a Fresnel lens that acts like a cylindrical lens having a first negative focal length. The second major surface has a plurality of parallel linear prisms running perpendicular to the prisms of the first major surface and forming a Fresnel lens that acts like a cylindrical lens having a second negative focal length.

5 Claims, 2 Drawing Sheets

ANAMORPHIC WIDE ANGLE SAFETY LENS

FIELD OF THE INVENTION

The present invention relates to Fresnel lenses for providing wide angle viewing in a safety window.

BACKGROUND OF THE INVENTION

The need for a clear view of the area surrounding a motor vehicle is a problem for any driver. This problem is particularly acute for the operator of a large truck because of the size of the blind spots associated therewith. The use of numerous and large mirrors have helped to alleviate this problem. One blind spot that remains, however, is close to the truck on the passenger side of the cab. In an attempt to alleviate such a problem a window is sometimes positioned near the bottom of the passenger side door. Such a window only reduces the size of the blind spot, however, rather than eliminating it. Blind spots still exist in front of, in back of, and directly below the window.

In order to further improve the driver's field of view a lens may be placed in the window. Such a lens is typically a Fresnel lens in order to conserve space. An example of a Fresnel lens that could be used to widen the viewing angle is the lens sold by Minnesota Mining and Manufacturing Company under the trademark "Vanguard." The Vanguard lens is a circular Fresnel lens, designed for use in the rear window of a van to provide wide angle viewing. A disadvantage of the Vanguard type lens lies in its circular symmetry. When the focal length of the lens is shortened to the degree required to provide adequate wide angle viewing in a horizontal plane, the effective viewing area is confined to a small portion of the lens. This problem is accentuated when, as is commonly the case, the lens is rectangular with the shorter dimension extending in the plane where greater wide angle viewing is required.

SUMMARY OF THE INVENTION

According to the invention a wide angle safety lens for use in a passenger side door of a motor vehicle has first and second major surfaces, each of which is a structured surface. The first major surface has a plurality of linear prisms forming a Fresnel lens that acts like a cylindrical lens having a first negative focal length and the second major surface has a plurality of linear prisms forming a Fresnel lens running perpendicular to the linear prisms of the first major surface and forming a Fresnel lens having a second negative focal length.

DETAILED DESCRIPTION OF THE PREFERRED EMBODIMENT

Figure 1:
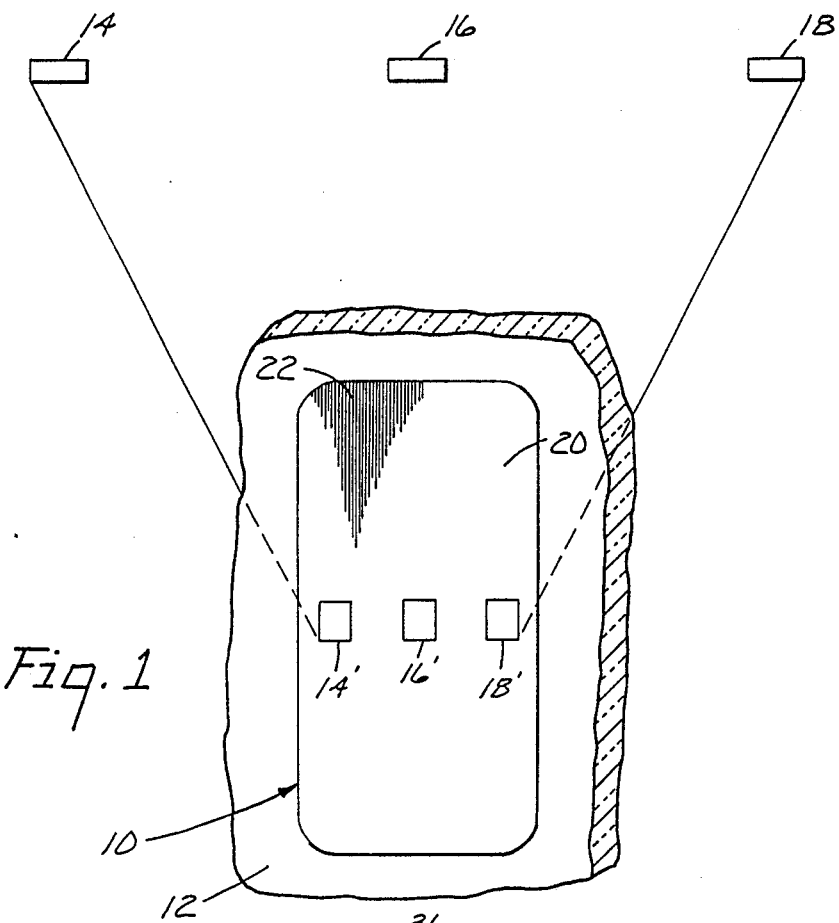
FIG. 1 is a drawing of a lens according to the invention as it would be installed for use.

FIG. 1 shows a lens according to the invention mounted on a window 12. Typically window 12 would be located in the lower part of the passenger door of a large truck and would be of glass. Lens 10 would typically be of a polymer material and is preferably an acrylic or polycarbonate material and would be formed by injection or compression molding. Lens 10 may be attached to window 12 in any of a number of known manners. As will be described subsequently, in the preferred embodiment lens 10 is attached to window 12 by a pressure sensitive adhesive. Alternatively the lens could be the window 12 itself.

Figure 2:
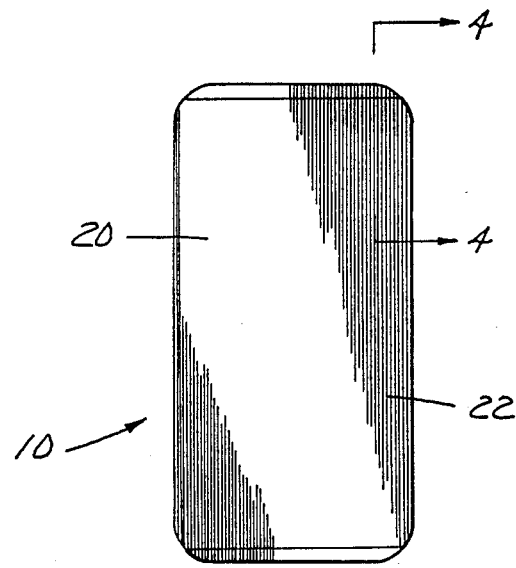
FIG. 2 is a drawing of a first side of a lens according to the invention.

FIG. 2 shows a first side 20 of lens 10. Side 20 of lens 10 is a structured surface having a plurality of parallel linear prisms 22 formed thereon. Linear prisms 22 form a Fresnel lens having a negative focal length. Thus surface 20 of lens 10 acts as a Fresnel lens producing a virtual image providing wide angle viewing in the horizontal dimension. In the preferred embodiment the focal length is constant across surface 20 of lens 22, although there is nothing in the invention that precludes varying the focal length. For example if viewing through a larger range of angles were desired to the rear than to the front a shorter focal length could be used on the side of surface 20 of lens 10 that was to face to the rear than would be used on the side that would face towards the front. A similar effect can be achieved by decentering the lens. Thus if the "central" Fresnel zone is located closer to one edge the range of angles through which viewing is provided will be decreased on the side close to the central zone and increased on the side distant the central zone.

Figure 3:
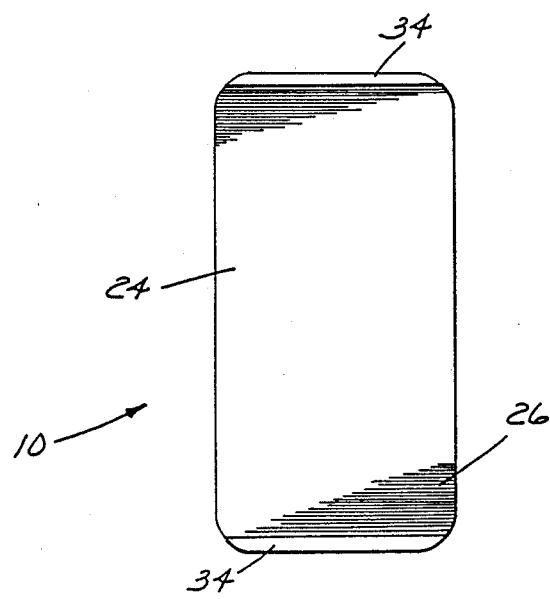
FIG. 3 is a drawing of a second side of a lens according to the invention.

FIG. 3 shows a second side 24 of lens 10. Side 24 of lens 10 has a plurality of parallel linear prisms 26 thereon running in the horizontal direction (i.e. perpendicular to prisms 22 of FIG. 2). Prisms 26 form a Fresnel lens having a negative focal power in the vertical dimension. Thus the lens produced by grooves 26 forms a virtual image permitting wide angle viewing in the vertical dimension.

The combined effects of the lenses produced by grooves 22 and 24 is to produce an anamorphic lens providing wide angle viewing in both the horizontal and vertical dimensions. The term anamorphic refers to the fact that the lens has different focal lengths in the horizontal and vertical dimensions. Thus the lens may provide viewing through a wider range of angles in the horizontal than in the vertical dimension.

FIG. 1 shows the effect of the wide angle viewing provided by the lens. Thus spatial regions 14, 16 and 18 are mapped onto regions 14', 16' and 18' of lens 10. As may be seen from the mapping shown in FIG. 1, there will be a distortion of the images as observed by a viewer looking through the lens. The viewer will, however, be able to see if an object is in the region that would otherwise be a blind spot. Furthermore, in some ways, a system providing anamorphic distortion is actually safer than a lens providing symmetric distortion, because the fact that an image is distorted is readily apparent to the viewer. Thus the viewer is less likely to be deceived as to the distance of an object than the viewer of a distorted image where the distortion is symmetric.

Figure 4:
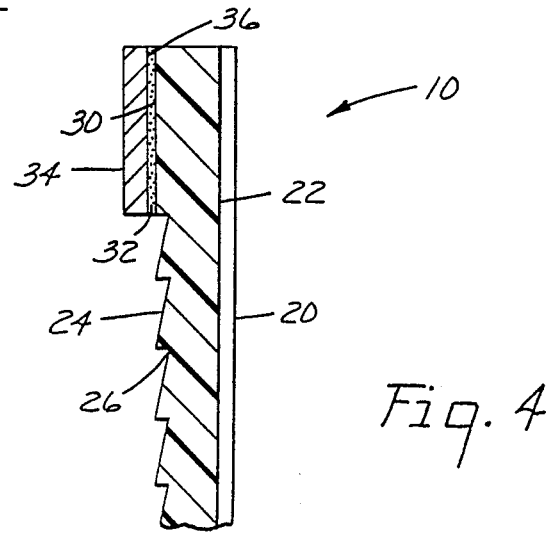
FIG. 4 is a cross-sectional view of a portion of a lens according to the invention.

FIG. 4 shows a cross section of a portion of the lens as indicated by the section lines of FIG. 2. Lens 10 has, as previously described, sides 20 and 24 with perpendicular linear Fresnel lenses formed thereon. A flat raised surface 30 is provided at the top of lens 10. A similar structure would be provided at the bottom of lens 10. On surface 30 is provided a layer 32 of a pressure sensitive adhesive which, in turn, is covered by a cover sheet 34. Cover sheet 34 has a release surface 36 adjacent pressure sensitive adhesive 32. In use cover sheet 34 may be removed from pressure sensitive adhesive 32 and than pressure sensitive adhesive 32 may be pressed against window 12 of FIG. 1 in order to secure lens 10 in position for use.

As may be seen in FIG. 4, the pressure sensitive adhesive is on side 24 of lens 10. It could alternatively be placed on side 20, but side 24 is preferred. This is because the lens is preferably positioned on the interior side of window 12 of FIG. 1, so that the glass of the window protects the polymer lens, and the lens has been found to perform better when the Fresnel lens having greater power (i.e. shorter focal length) faces the interior of the vehicle. Since the lens formed by prisms 22 on side 20 of lens 10 has greater power in the preferred embodiment, optimum performance is achieved by attaching side 24 to window 12.

What is claimed is:

1. A wide angle safety lens for use in a passenger side door of a motor vehicle, said lens having first and second major surfaces said first major surface being a structured surface having a plurality of linear prisms thereon, said linear prisms forming a Fresnel lens that acts like a cylindrical lens having a first negative focal length and said second major surface being a structured surface having a plurality linear prisms thereon, said linear prisms on said second major surface being perpendicular to said linear prisms on said first major surface and said linear prisms on said second major surface forming a Fresnel lens that acts like a cylindrical lens having a second negative focal length.

2. The lens of claim 1 wherein said first and second negative focal lengths are different.

3. The lens of claim 1 wherein said first major surface has a flat region adjacent one edge and further comprising a pressure sensitive adhesive on said flat region.

4. The lens of claim 3 wherein said first and second negative focal lengths are different.

5. The lens of claim 4 wherein said second negative focal length is shorter than said first negative focal length.

* * * * *